(12) United States Patent
Duan et al.

(10) Patent No.: US 8,498,544 B2
(45) Date of Patent: Jul. 30, 2013

(54) ITERATIVE CARRIER PHASE COMPENSATION IN COHERENT FIBER OPTIC RECEIVERS

(75) Inventors: Chunjie Duan, Brookline, MA (US);
Kieran Parsons, Cambridge, MA (US);
Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 318 days.

(21) Appl. No.: 13/024,769

(22) Filed: Feb. 10, 2011

(65) Prior Publication Data
US 2011/0129234 A1     Jun. 2, 2011

(51) Int. Cl.
*H04B 10/00*     (2006.01)

(52) U.S. Cl.
USPC .......................................... 398/208; 398/211

(58) Field of Classification Search
USPC ................................. 398/202–214
See application file for complete search history.

(56) References Cited

U.S. PATENT DOCUMENTS

| | | | | |
|---|---|---|---|---|
| 6,625,231 B1* | 9/2003 | Shen | ............................. | 375/316 |
| 7,724,836 B2* | 5/2010 | Hartmann et al. | ............. | 375/285 |
| 7,792,220 B2* | 9/2010 | Alderson et al. | .............. | 375/324 |
| 8,045,634 B2* | 10/2011 | Zhang | ............................ | 375/260 |
| 8,116,367 B2* | 2/2012 | Carrer et al. | .................. | 375/233 |
| 2011/0129234 A1* | 6/2011 | Duan et al. | .................... | 398/208 |

* cited by examiner

*Primary Examiner* — Agustin Bello
(74) *Attorney, Agent, or Firm* — Dirk Brinkman; Gene Vinokur

(57) ABSTRACT

A method and an optical receiver compensates for an error in a phase of an optical signal in a receiver. The signal includes blocks of symbols in a sequence. Each block is decoded based on a partially phase compensated symbols, and an average phase error for the block is estimated. Forward phase compensation and backward phase compensation is performed on the block based on the average phase error, and the decoding, estimating, performing is iterated until a termination condition is satisfied to produce a phase compensated block.

9 Claims, 7 Drawing Sheets

Prior Art Phase noise distribution

Prior Art Phase error

ITERATIVE CARRIER PHASE COMPENSATION IN COHERENT FIBER OPTIC RECEIVERS

FIELD OF THE INVENTION

This invention relates generally to optical communication, and more particularly to coherent fiber optic communication.

BACKGROUND OF THE INVENTION

A desire to increase both the data rate and transmission distance of optical communication links has prompted the use of coherent signaling. Conventionally, optical communication systems have relied on the use of simple signaling methods to encode data bits onto an optical carrier. The most common signaling method is intensity modulation, in which a laser is gated to allow high intensity light to enter a fiber optical cable when a '1' bit is to be transmitted and low intensity light when a '0' bit is transmitted. This is a form of on-off keying and has the advantage that it is easily demodulated by a photo-diode and an appropriate threshold.

The main drawback of on-off keying is that the bandwidth efficiency is low, due to the fact that information is only transmitted in a single dimension. Coherent signaling techniques, on the other hand, allow for the transmission of multidimensional signals, by modulating both the intensity and the phase of the laser light.

FIG. 1 shows a prior art coherent optical communication system. A transmitter 100 includes a first laser light source (transmit Local Oscillator—TXLO), 101, whose output is a constant beam of light, or pulse trains if pulse carvers are used. The beam is input to a modulator 102, which modulates both the amplitude and the phase of the input light beam according to a data source 103. The data source in the transmitter typically includes a forward error correction (FEC) encoder. Thus, the combination of laser and modulator is capable of generating any common two dimensional digital modulation format, e.g., phase shift keying (PSK) and quadrature amplitude modulation (QAM).

The dimensional signal is passed through an optical channel, 104, and is detected and demodulated in a receiver 105. A coherent receiver includes a second laser light source (receive Local Oscillator RXLO) 101', an optical hybrid demodulator and photo detectors (termed a "coherent detector"), 106, and an electrical digital receiver 107.

Several impairments affect the performance of the optical communication link, including the effect of non-ideal lasers. An ideal laser output can be expressed as $$E_{cw}(t) = \sqrt{P_s} \exp(j\omega_s t + \theta_s) e_s,$$

where $E_{cw}(t)$ is an optical carrier, t is time $\sqrt{P_s}$ is the an amplitude, $\omega_s$ is a frequency in radians per second, $\theta_s$ is an initial phase, and $e_s$ is a polarization of the optical carrier. Deviations from the above ideal laser output are caused by spontaneous emitted photons, which cause intensity and phase fluctuations and result in a laser output that can be expressed as $$E_{cw}(t) = \sqrt{P_s + \delta P(t)} \exp(j\omega_s t + \theta_s + \theta_{ns}(t)) e_s,$$

where $\delta P(t)$ and $\theta_{ns}(t)$ represent intensity and phase noise processes, respectively.

Because these processes are due to the spontaneous emissions, they are reasonably modeled as Gaussian distributed random processes. The effect of the phase noise is to broaden a power spectral density of the optical field. Thus, the laser output is no longer confined to a single frequency tone, but typically has a Lorentzian-shaped spectrum. The full-width half maximum (FWHM) bandwidth is normally termed the "laser linewidth." The phase noise, $\theta_{ns}(t)$, or equivalently the laser linewidth, is particularly troublesome for coherent systems in that the phase of the carrier $E_{cw}(t)$ is needed to coherently demodulate any two dimensional modulation format.

The random carrier phase $\theta_{ns}(t)$ impairs carrier recovery processes, and generally the larger the laser linewidth, the more difficult it is for the receiver to track the carrier phase changes. The coherent receiver makes use of an additional laser 101' to generate a local version of the optical carrier for mixing with the received signal. The non-ideal linewidth of this laser also compound the effects of the transmit laser's linewidth. Typical linewidth requirements for lasers in coherent systems are on the order of tens to hundreds of kHz, whereas direct detection or differentially Quadrature Phase Shift Keying (QPSK) can greatly reduce the linewidth requirements to tens of MHz because the signal formats are less sensitive to carrier phase changes. Studies show that a QPSK system requires maximum linewidth of 250 KHz, and a 16QAM systems requires 6.9 KHz linewidth.

In addition to laser linewidth, the received signal also experiences linear dispersive effects such as chromatic dispersion, as well as nonlinear effects, such as fourwave mixing as the signal traverses the optical fiber. Typical receivers make use of electronic signal processing to reduce the dispersive and non-linear effects. Thus, it is desirable to compensate for laser linewidth effects using electronic signal processing techniques as well.

In addition to the zero-mean phase noise, carrier frequency offset (CFO) $\Delta F$ may exist between two oscillators due to the temperature variation, aging and other slow effects. CFO is generally very slow with regard to the symbol rate, and therefore can be considered constant over a number of transmitted symbols. CFO adds additional phase error.

The non-zero linewidth $\Delta v$ of the local oscillator (LO) results in a phase noise from one received symbol r(n) to the next symbol r(n+1) is represented by $$\delta \theta_k = \theta_k - \theta_{k-1} = T_s[\mathcal{N}(0, (2\pi \Delta v)^2) + \Delta F],$$

where $T_s$ is the symbol duration and $\mathcal{N}(0, \sigma^2)$ denotes a zero mean normal distribution with variance, $\sigma^2$. The method described in this invention, however, does not require the phase noise distribution to be normal, or zero-mean.

The phase error of the $k^{th}$ symbol can be expressed as $$\theta_k = \sum_{i=1}^{k} \delta \theta_i + \theta_0 = \theta_0 + T_s \sum_{i=1}^{k} N(0, 2\pi \Delta v) + k T_S \Delta F$$

$$= \theta_m + T_s \sum_{i=m+1}^{k} N(0, 2\pi \Delta v) + (k-m) T_S \Delta F.$$

FIG. 2A shows a zero-mean distribution of the phase noise when the laser linewidth is 5 MHz and the symbol rate is 25 G Hz. The distribution approximates a normal distribution, and the majority of the phase noise is within $+/- 6 \times 10^{-3}$ radian.

FIG. 2B shows the phase error over 100,000 symbols, with the phase of the initial symbol is 0 rad. In the example, the accumulated phase error is 0.8 rad. Clearly, a coherent system with such high LO linewidth cannot function properly without proper phase compensation. FIG. 2B also shows that the phase error is increased in the presence of CFO. In the example, $\Delta F = 50$ kHz.

To limit the phase error, most conventional systems use LOs with very narrow linewidth. Because the requirement of the linewidth is also related to the modulation scheme, modulations with higher spectrum efficiency requires a much tighter LO linewidth.

To achieve the required performance, conventional coherent optical systems use lasers with very narrow linewidth as local oscillators, typically external cavity distributed feedback (DFB) lasers. These lasers have the linewidth $\Delta v$ in the tens of kHz range, but are very expensive, have larger form factor, and higher power consumption.

Many other laser sources such as DFB lasers and vertical-cavity surface-emitting laser (VCSELs) are more cost and power efficient. However, the strict linewidth requirement prohibits the use of these inexpensive, and more energy efficient lasers in coherent systems, as the receiver performance degrades rapidly with increasing linewidth. Most of the DFB lasers, VCSELs and tunable lasers have linewidth that is in the range of MHz. Conventional current coherent systems will not function with adequate performance under such large linewidth.

Therefore, it is desirable to design coherent systems with relaxed linewidth tolerance to allow lower cost, or tunable light sources to be used in the coherent system. This will significantly lower the overall system cost and energy consumption. Tunable lasers also provide flexibility and reconfigurability to coherent systems.

SUMMARY OF THE INVENTION

The embodiments of the invention provide a coherent receiver and method that can compensate for phase error induced by non-zero linewidth and carrier frequency offset of local oscillators (LO), i.e., lasers, and effectively increases the linewidth tolerance. The method can improve the performance of the transmission at a given linewidth, or achieve the same performance with a larger linewidth.

The receiver estimates the phase error of the received blocks of symbols with the assistance of a channel decoder, and compensates the phase error iteratively. Each block of received symbols is equalized and phase compensated using an initial estimate of the phase.

The equalized and phase compensated symbol block is then fed into a decoder to produce information bits. The decoded information bits are used to regenerate the transmitted symbols.

A phase estimator compares the received symbols and the regenerated transmitted symbols, and outputs an estimated average phase error. The average phase error estimate is used to apply phase compensation on the next block, which is read in by the decoder to decode additional information bits. This compensation process iteratively continues until the entire received signal is compensated and decoded.

This compensation also produces an updated phase compensated symbol stream. The receiver can carry out this method once, or in multiple iterations. Each iteration refines the phase estimation for the block and updates the phase compensate stream to be used by the next iteration. The iterations terminate when a termination condition is satisfied, e.g., a fixed number of iterations has been reached, or the decoded information bit sequence converges.

DETAILED DESCRIPTION OF THE PREFERRED EMBODIMENT

In this description, the following variables are defined and used:

$r_l$: the phase compensated received symbol stream after the $l^{th}$ iteration. $r_0$: the original stream.
$r_l^k$: is the $k^{th}$ symbol block of the $l^{th}$ iteration
$r_l(n)$: the $n^{th}$ received, phase compensated symbol.
$u^k$: the $k^{th}$ block of the input symbols to the interleaver/decoder.
$\hat{d}^k$: the decoder information bits for the $k^{th}$ block.
$s^k$: the $k^{th}$ block of the transmitted symbols.
$\hat{s}^k$: the $k^{th}$ block of the estimated transmitted symbols.
$\hat{\theta}_l^k$: the estimated average phase error of the $k^{th}$ block in the $l^{th}$ iteration.

The symbol index is in the parenthesis, e.g., r(n). A superscript is used as step index and a subscript is used for iteration index. These are sometimes omitted for clarity when there is no cause for confusion. A bold font indicates the variable is a vector/matrix. A circumflex (hat) (â) is used to indicate that the variable a is an estimate.

Figure 1:
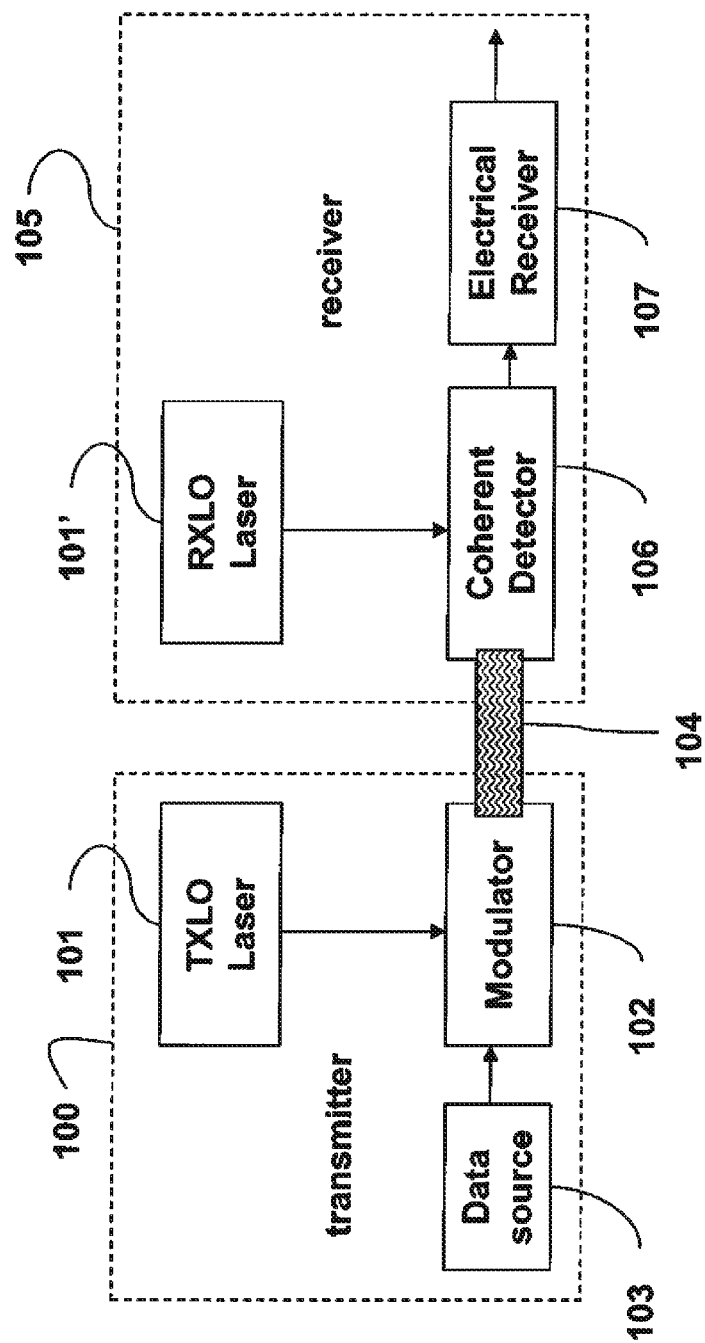
FIG. 1 is a schematic of a prior art coherent optical transmission system.
Figure 2A:
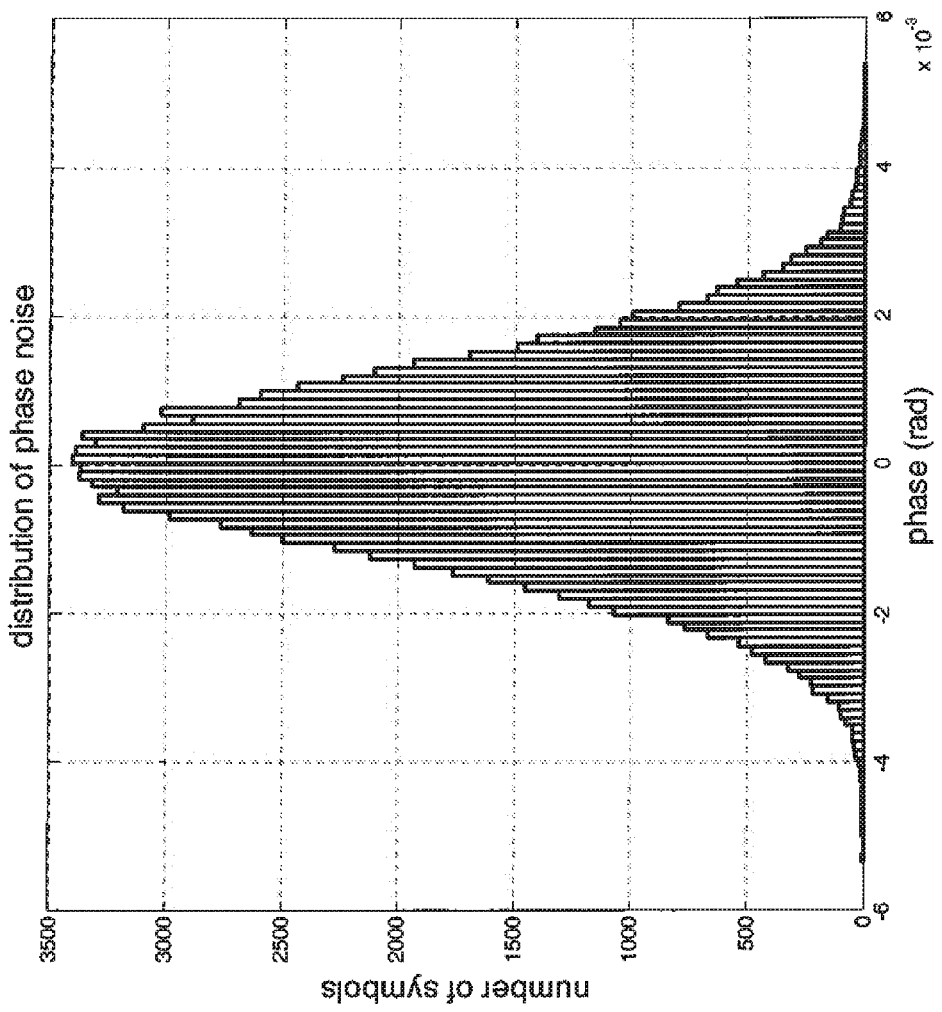
FIG. 2A is a graph of prior art phase noise distribution.
Figure 2B:
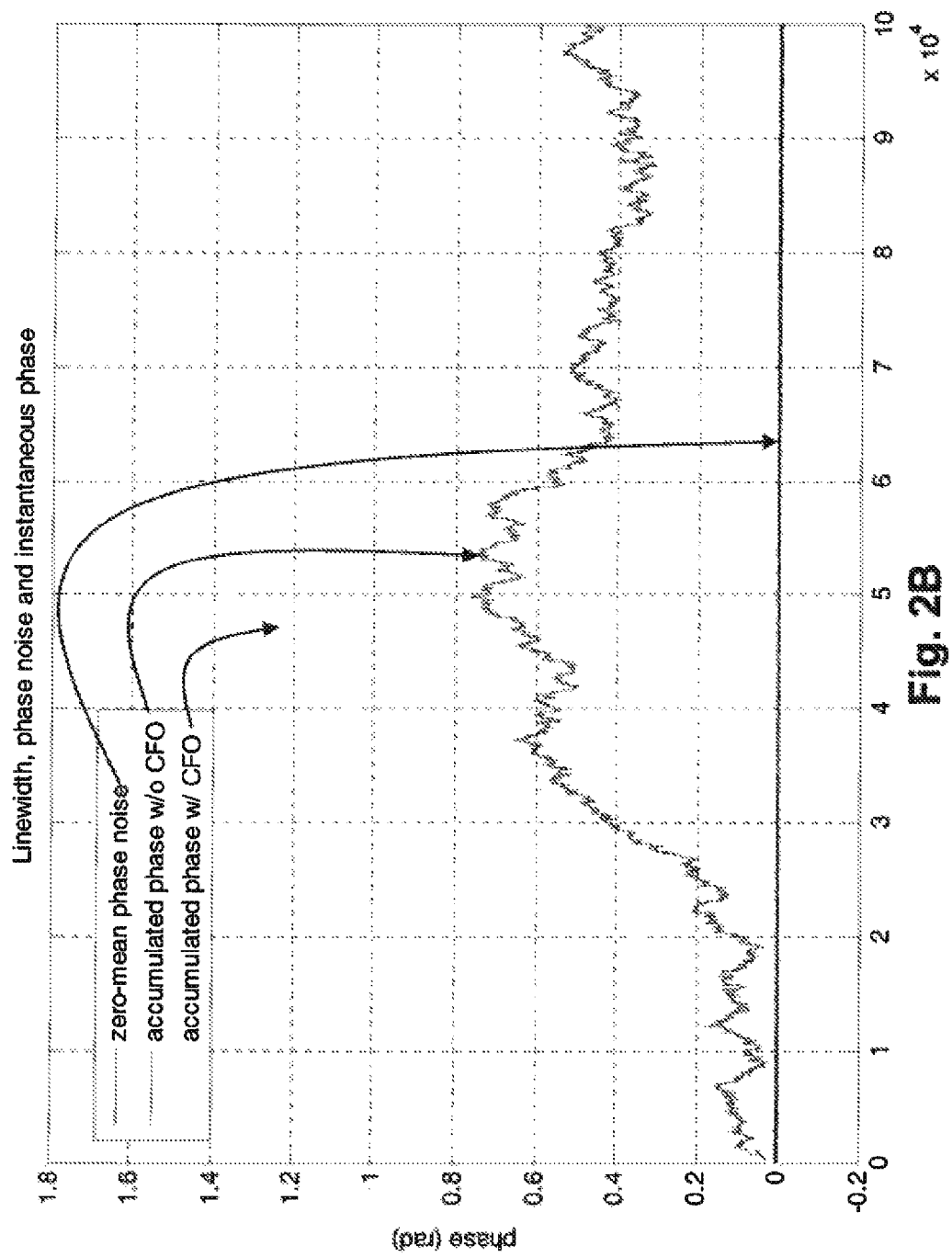
FIG. 2B is a graph of prior art phase error of received symbols.
Figure 3:
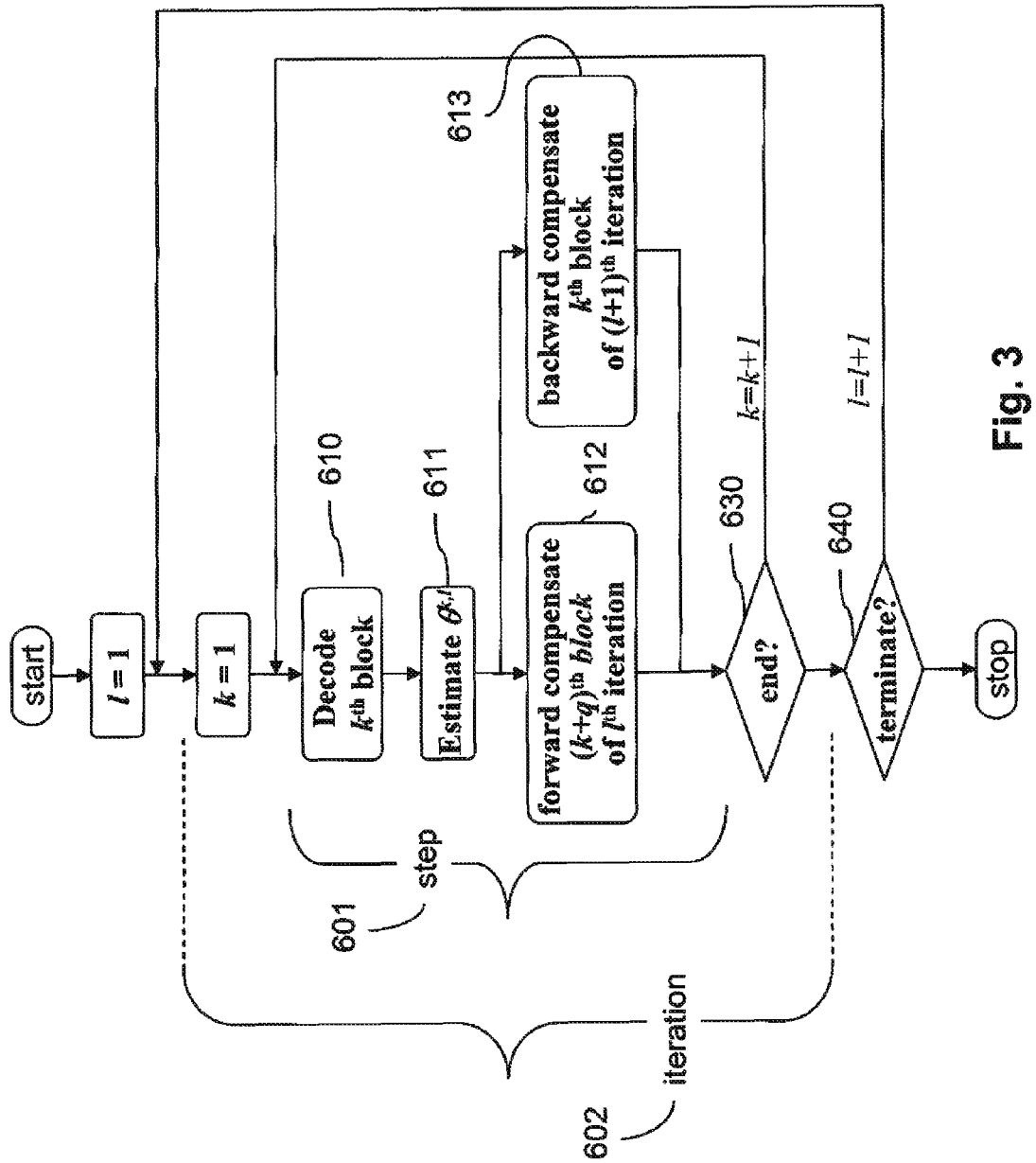
FIG. 3 is a flow chart of a phase compensation method according to embodiments of the invention.

FIG. 3 shows a phase compensation method according to embodiments of our invention. The compensation is performed in one or more iterations 602. Each iteration is comprised of multiple steps 601. The steps can be performed in a processor of a receiver connected to a memory and input/output interfaces as known in the art.

At the start, indices l and k are initialized. Then in each step, the receiver:
  a) decodes 610 a $k^{th}$ block of information symbols based on some received, partially phase compensated symbols;
  b) estimates 611 an average phase error;
  c) performs forward phase compensation 612 on the block of symbols;
  d) performs backward phase compensation 613 on the block of symbol sequence.

An iteration is completed at the end 630 of the symbol block. The entire process terminates 640 when a termination condition is satisfied, e.g., a predetermined maximum number of iteration is reached, or the decoded information bit sequence converges. The receiver then outputs the decoded information bit sequence of the final iteration.

Figure 4:
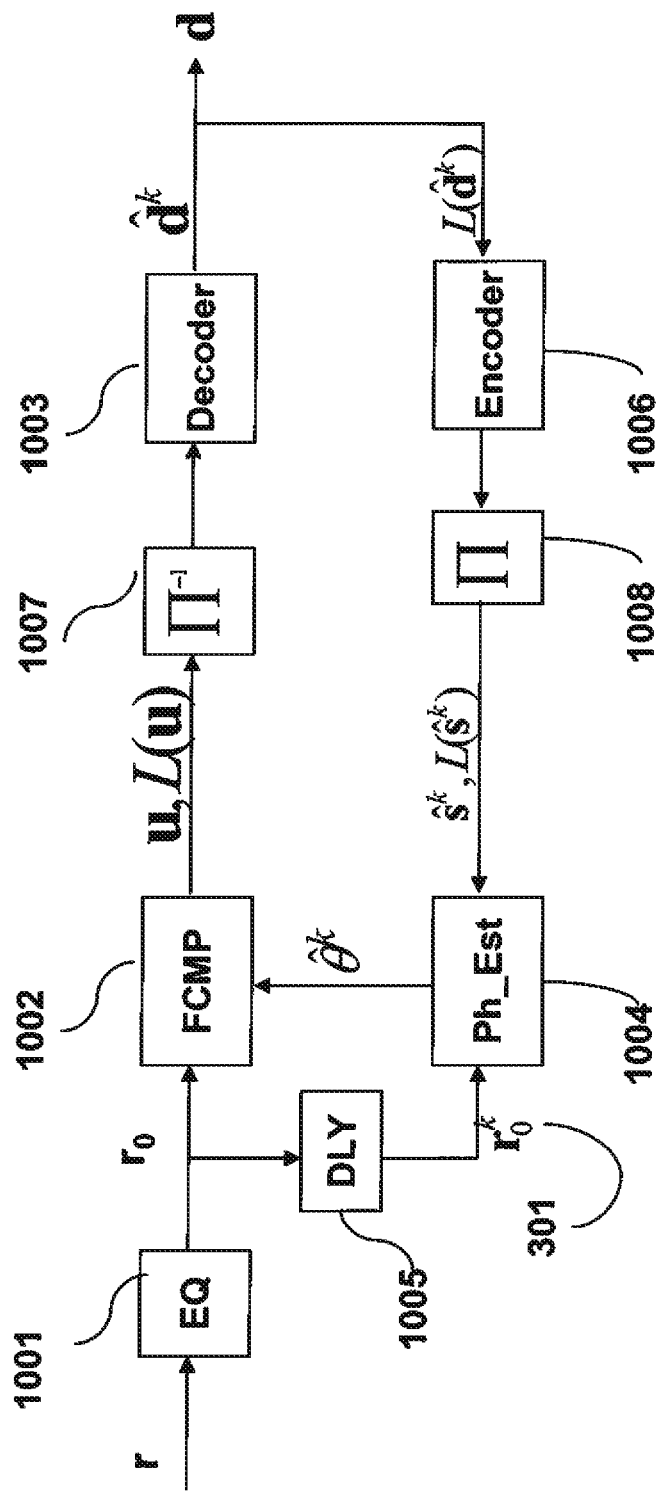
FIG. 4 is a schematic of a non-iterative phase compensating receiver according to embodiments of the invention.

FIG. 4 shows one embodiment of a non-iterative phase compensating receiver. The receiver includes an equalizer 1001, a forward phase compensator (FCMP) 1002, a phase estimator (Ph_Est) 1004, a forward error correcting (FEC) decoder 1003, an inverse de-interleaver 1007, and an interleaver 1008. The variables shown are defined above.

Figure 5:
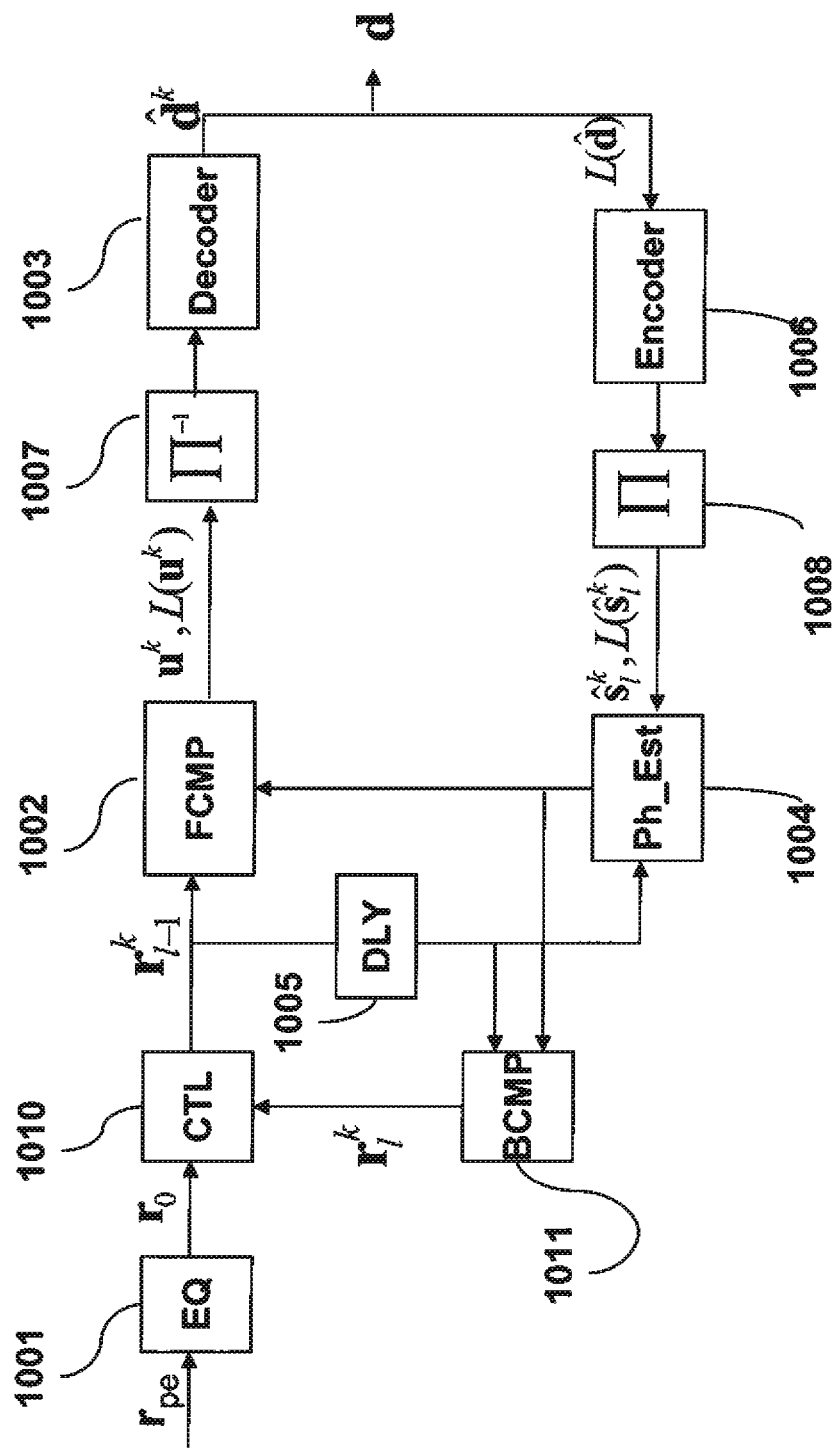
FIG. 5 is a schematic of an iterative phase compensating receiver according to embodiments of the invention.

FIG. 5 shows an implementation of an iterative phase compensating receiver, which also includes an equalizer (EQ), an iteration control unit (CTL) 1010 and a backward phase compensator (BCMP) 1011, in addition to the functional blocks included in FIG. 4.

The equalizer 1001 compensates for the effects from the non-ideal fiber optic channels, such as chromatic dispersion, polarization mode dispersion, and non-linear effects, etc. The equalized blocks of received symbol sequences are denoted as $r_0 = [r_0(1), r_0(1), \ldots, r_0(N)]$ 301, where $r_0(n)$ is the $n^{th}$ symbol and N is the total number of symbols in the sequence.

The phase estimator 1004 compares two blocks of symbols and estimates the average phase error θ between the blocks. The estimator can also generate a probability function representing the phase error, such as the log likelihood of the estimate $L(\hat{\theta})$.

Delay block (DLY) 1005 is used to match input symbols r(n) and s(n) in the time domain for the phase estimator.

The FCMP 1002 and the backward phase compensator 1011 compensate the phase rotation of a block of input symbols $r^k$ with an estimated phase error $\theta^k$ to produce a block of new symbols.

The de-interleaver 1007 is used before the decoder when the transmitter has an interleaver after the encoded data. An interleaver 1008, implemented in pair with the de-interleaver 1007, re-orders the regenerated symbol to match the order of the received symbols.

The error correction decoder 1003 receives the phase compensated symbol sequence blocks u, and outputs a decoded information bit sequence $\hat{d}$. If a soft output decoder is used, the decoder also produces the soft likelihood of the information bit sequence $L(\hat{d})$ 306.

The FEC encoder 1006 and the interleaver 1008 regenerate an estimated transmitted symbol sequences $\hat{s}_l$ from an estimated information bit sequence $\hat{d}$ in the lth iteration.

Details of Method and Receiver

More details of the method and the receiver are described as follows:

The initial phase $\hat{\theta}_0(0)$ of the first received symbol is known and the received symbol sequence $r_0$ has already been phase rotated, such that $\theta_0(0) \approx 0$. This is reasonable, and such estimation can be done, e.g., by evaluating the phase of known training preamble symbols preceding the data symbol stream. The original equalized received symbol sequence is denoted as $$r_0 = [r_0(1), r_0(2) \ldots, r_0(N)],$$

where $r_0(n)$ is the $n^{th}$ symbol and N is the total number of symbols.

In each step 601, the receiver estimates the average phase error of a block of P symbols. Each iteration 602 has $$K = \left\lceil \frac{N}{P} \right\rceil$$

steps.

In the $k^{th}$ step, the average phase error of the $k^{th}$ block $\theta^k$ is estimated using the previous symbols in the $(k+q-1)^{th}$ blocks. The number of the additional symbol blocks needed by the decoder to decode information bits for block k is q−1, e.g. the decoding delay.

At the beginning of each iteration the receiver reads in q blocks of symbol, $r^1, r^2, \ldots, r^q$, de-interleaves the symbols. Then, the decoder estimates the information bits $\hat{d}^1$ 304. Note that the first q blocks of the forward phase compensated sequence u 303 are the same as r, i.e., $u^i = r^i$ for $i \leq q$;

The receiver encodes $\hat{d}^1$ and interleaves the re-encoded symbols to produce an estimate of the P transmitted symbols in the first block, $\hat{s}^1$. Then, the receiver estimates the average phase error of the first block 302 using the first block of received symbols $r^1$ and the $1^{st}$ block of estimated transmitted symbols $\hat{s}^1$.

After, the first $\hat{\theta}^1$ become available, the receiver uses the estimate to compensate the phase of the $(q+1)^{th}$ block of the symbols $r^{q+1}$. For example, the phase compensation can be performed as $u^{q+1}(n) = r^{q+1}(n) \exp(-j\hat{\theta}^1)$, for all symbols in the $(q+1)^{th}$ block. The input to the de-interleaver/decoder is u.

Next, the newly generated block $u^{q+1}$ is fed to the de-interleaver and decoder to generate an information bit block $\hat{d}^2$ and regenerate $\hat{s}^2$ and eventually the average phase error estimate of the next block $\hat{\theta}^2$.

The next symbol block is phase compensated to be used for the following step. After the phase estimation for the $k^{th}$ block is complete, the receiver proceeds to the $(k+1)^{th}$ block. This step repeats until all blocks have been processed in the first iteration.

For most of the blocks, (q−1) additional blocks are required to decode one block of data properly. The last blocks of the sequence generally do not require additional blocks for decoding when codes are properly terminated e.g., convolutional codes typically are terminated to a known (zero) state by inserting tail bits. This allows the process to continue until it reaches the end of the sequence and produces phase estimate for all K blocks, instead of just K−q+1 blocks.

The backward phase compensator generates a new symbol sequence $r_l$ for the next $(l+1)^{th}$ iteration. The new symbols sequence is derived by directly compensating symbol block $r^k$ 315 with an estimated average phase error $\hat{\theta}^k$ $$r_l^k(n) = r_{l-1}^k(n) \exp(-j 2\pi \hat{\theta}_l^k), \text{ for all } k \in [0, K]; \text{ or}$$

$$r_l^k = r_{l-1}^k e^{-j 2\pi \hat{\theta}_l^k}, \text{ for all } k \in [0, K].$$

In the $k^{th}$ step, the decoder 1003 outputs $k^{th}$ information bit sequence $\hat{d}^k$ given partial symbol sequence $u^1, u^2, \ldots u^{k+q}$. For example, if a maximum likelihood (ML) decoder is used, the decoded data are $$\hat{d}^k = \operatorname{argmax} Pr(d^k | \hat{d}^{1:k-1}; u^{1:k+q}),$$

where the function arg max returns the argument of the maximum.

Other types of decoders such as a maximum a posteriori (MAP) decoder or a linear decoder can also be used. Although soft input soft output (SISO) decoders offer better phase estimation performance, the receiver described herein invention does not require SISO decoders. Extra symbols are sometimes needed for correct decoding and as a result, additional symbol blocks $U^{k+1}, \ldots, u^{k+q-1}$ are read in by the de-interleaver and decoder.

The phase estimator 1004 determines the average phase rotation of the input symbol sequence block $r_{l-1}^k$ 315 by comparing it with the estimated transmitted symbol block $\hat{s}_l^k$ 305. Assuming Gaussian distributed noise, the ML estimator is $$\hat{\theta}^k = \operatorname{argmax} \prod_{n \in blk\_k} \exp\left(\frac{-[r_{l-1}(n) - \hat{s}(n)e^{-j\theta}]^2}{2\sigma^2}\right),$$

or a linear estimator $$\hat{\theta}_l^k = \frac{\sum_{n \in blk\_k} w_n \angle(r_{l-1}(n), \hat{s}_l(n))}{\sum_{n \in blk\_k} w_n},$$

where $\angle(,)$ is the operator that computes the angle of two complex numbers, $w_n$ is a weight coefficient that can be determined based on noise variance σ(n), amplitude of r(n) and/or L(s(n)). In the case of equal weights, the estimator can be further simplified to $$\hat{\theta}_l^k = \frac{1}{p} \sum_{n \in blk\_k} L[r_{l-1}(n), \hat{s}_l(n)].$$

The forward phase compensator 1002 and backward phase compensator 1011 can both be implemented by rotating the symbols within block k+q by an angle of $-\hat{\theta}_l^k$ corresponding to the average phase error, given as $$u^{k+q}(n) = r_{l-1}^{k+q}(n) \exp(-j2\pi\hat{\theta}_l^k), \text{ for all } k \in [1, K-q+1],$$
and $$r_l^k(n) = r_{l-1}(n) \exp(-j2\pi\hat{\theta}_l^k), \text{ for all } k \in [1, K].$$

The forward phase compensator 1002 and backward phase compensator 1011 may also be implemented using ML equalizers, which produces the symbols $u^{k+q}$. The log likelihood ratios (LLRs) of the symbols are as $$L(u(n)) = \log(Pr[u(n)|r_{l-1}(n), \hat{\theta}_l^k]), \text{ for all } n \in \text{block } k+q;$$

and $$L(r_l^k(n)) = \log(Pr[r_l^k(n)|r_{l-1}^k(n), \hat{\theta}_l^k]), \text{ for all } n \in \text{block } k;$$
and $k \in [1, K]$.

If both $L(r_l(n))$ and $L(\hat{\theta}^k)$ are available, $L(u(n))$ can be approximated as $$L(u(n)) = 2\tanh^{-1}\left(\tanh\left(\frac{L(u(n))}{2}\right) \cdot \tanh\left(\frac{L(\hat{\theta}^k)}{2}\right)\right) \text{ and}$$

$$L(r_l^k(n)) = 2\tanh^{-1}\left(\tanh\left(\frac{L(r_{l-1}^k(n))}{2}\right) \cdot \tanh\left(\frac{L(\hat{\theta}^k)}{2}\right)\right).$$

The receiver exits the outer-loop when the termination condition is satisfied. Some of the possible termination conditions include:

a) the decoded information bit stream converges, i.e., $$\hat{d}_l = \hat{d}_{l-1}; \text{ and}$$

b) the residual phase error is lower than a predefined threshold, i.e., $$\max_k |\Delta\theta_l^k| \leq \theta_{threshold},$$

for all blocks.

Figure 6:
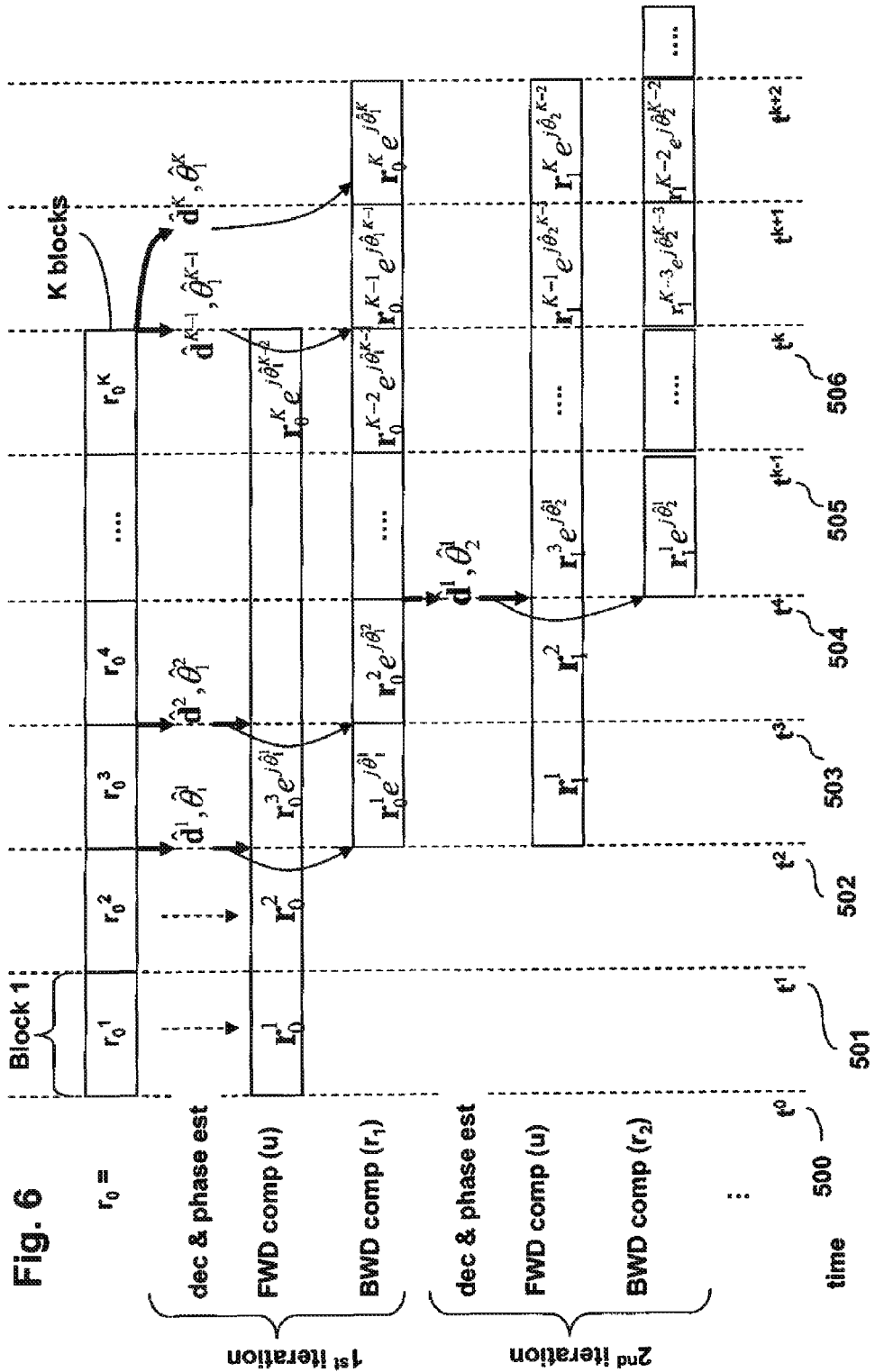
FIG. 6 is a schematic of data flow of the phase compensating process according to embodiments of the invention.

FIG. 6 shows the data flow and timing of the pipelined process for the iterative phase compensation and decoding, i.e., a new iteration starts before the previous one is terminated.

Let $t^0$ 500 be the beginning of the received symbol sequence, $t^i$ the end of block i and the beginning of block i+1, $t^K$ is the end of the $K^{th}$ block of the received sequence. In the example shown in FIG. 6, we assume q=2. For clarity, we also ignore the delays in the functional blocks, e.g., decoder, phase estimator and compensator.

The first iteration starts at time $t^0$. At time $t^2$, symbol blocks $r_0^1$ and $r_0^2$ are received, $d^1$ can therefore be decoded and $\hat{\theta}_1^1$ is determined. The forward compensator generates $u^3$. The backward compensator generates $r_1^1$. The final block $r_0^K$ is available at $t^K$ 506 and both $\hat{\theta}_1^{K-1}$ and $\hat{\theta}_1^K$ can be determined after $t^K$ 506, and so forth. The $2^{nd}$ iteration therefore can start at $t^2$ 502. Block $r_1^1 = r_0^1 e^{-j2\pi_1^1}$ is read in after $t^3$ 503 and $r_1^2 = r_0^2 e^{-j2\pi_1^2}$ after $t^4$ 504. The phase estimate $\hat{\theta}_2^1$ becomes available to the forward and backward compensator in the $2^{nd}$ iteration blocks at $t^4$ 504. If a $3^{rd}$ iteration is needed, it can start at $t^4$ 504.

Note that $r_0^2$ and $\hat{\theta}_1^2$ are actually available at as early as $t^3$ 503 and therefore the $2^{nd}$ iteration can start as early as at $t^3$ 503.

EFFECT OF THE INVENTION

The receiver described herein can effectively remove a significant portion of the phase error and therefore enable the system to have much higher tolerance to the linewidth of local oscillators at both the transmitter and the receiver. The receiver can improve the overall performance of the transmission or/and allows system be built using local oscillators with wider linewidth to reduce the cost.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for compensating for an error in a phase of a signal in a receiver, wherein the signal is an optical signal and includes blocks of symbols in a sequence, and the receiver is an optical receiver, comprising the steps of:
    equalizing the signal to produce an equalized signal;
    delaying the equalized signal to produce a delayed signal;
    inverse-de-interleaving the delayed signal;
    decoding each block based on partially phase compensated symbols;
    estimating an average phase error for each block;
    encoding each block after the decoding for feedback to die inverse-deinterleaving;
    performing forward phase compensation and backward phase compensation on the block based on the average phase error; and
    iterating decoding, estimating, encoding, and performing until a termination condition is satisfied to produce a phase compensated block.

2. The method of claim 1, wherein the decoding is based on a partially compensated symbol sequence.

3. The method of claim 1, wherein estimating is based on previously decoded symbols.

4. The method of claim 1, wherein the decoding is based on a maximum likelihood decoder.

5. The method of claim 1, wherein the decoding is based on a maximum a posteriori decoder.

6. The method of claim 1, wherein the phase compensation is performed by rotating the phase of the symbols in the block by an angle corresponding to the average phase error.

7. The method of claim 1, wherein the phase compensation produces a likelihood of the symbols based on an estimated likelihood of phase rotation and a likelihood of uncompensated symbols.

8. The method of claim 1, wherein a new iteration starts before a previous iteration completes.

9. A receiver for compensating for an error in a phase of a received signal, wherein the signal is an optical signal and includes blocks of symbols in a sequence, and the receiver is an optical receiver, comprising:

a decoder applied to each received a block based on a partially phase compensated symbols;

estimating an average phase error for each block;

a forward phase compensator and a backward phase compensator applied to phases of the symbols in the block based on the average phase error;

an equalizer connecting the received signal to the forward phase compensator;

a delay connected between an output of the equalizer and an input of a phase estimator, and wherein an output of the phase estimator is connected to the input of the forward compensator;

an in de-interleaver connected to an output of the forward compensator and in input of the decoder; and an encoder connected to an output of the decoder and input of the a de-interleaver, and wherein an output of the de-interleaver is connected to the input of the phase estimator.

* * * * *